United States Patent [19]

Kunz

[11] Patent Number: 5,383,123
[45] Date of Patent: Jan. 17, 1995

[54] PROCESS AND DEVICE FOR CHASSIS CONTROL

[75] Inventor: Dieter Kunz, Ditzingen-Schoeckingen, Germany

[73] Assignee: Robert Bosch GmbH, Stuttgart-Feuerbach, Germany

[21] Appl. No.: 967,199

[22] Filed: Oct. 27, 1992

[30] Foreign Application Priority Data

Dec. 6, 1991 [DE] Germany ............... 4140270

[51] Int. Cl.$^6$ ............................................. B60G 17/08
[52] U.S. Cl. ........................ 364/424.05; 364/424.01; 280/707
[58] Field of Search ............ 364/424.05, 424.01, 364/426.01, 426.02; 280/707; 180/41

[56] References Cited

U.S. PATENT DOCUMENTS

| | | | |
|---|---|---|---|
| 4,651,290 | 3/1987 | Masaki et al. | 364/550 |
| 4,703,645 | 11/1987 | Hudacsek et al. | 73/11 |
| 5,020,781 | 6/1991 | Huang | 280/707 |
| 5,075,855 | 12/1991 | Sugasawa et al. | 364/424.05 |
| 5,101,355 | 3/1992 | Wada et al. | 364/424.05 |
| 5,142,475 | 8/1992 | Matsunaga et al. | 364/424.05 |
| 5,142,477 | 8/1992 | Tsutsumi et al. | 364/424.05 |
| 5,163,704 | 11/1992 | Wada | 280/707 |
| 5,189,615 | 2/1993 | Rubel et al. | 364/424.05 |

FOREIGN PATENT DOCUMENTS 3837863 3/1990 Germany .
3939292 5/1991 Germany .

OTHER PUBLICATIONS

Pkw-Abv-Bremssysteme Mit Wieteren Integrierten Funktionen, H. C. Klein (Author) Automobil–Industrie May 1989, pp. 659–673.
Compound Control of Braking and Suspension Systems, H. C. Klein (Author) pp. 199–211.

*Primary Examiner*—Kevin J. Teska
*Assistant Examiner*—Tan Nguyen
*Attorney, Agent, or Firm*—Baker & Daniels

[57] ABSTRACT

Suspension systems are actuated during braking and/or acceleration maneuvers whereby each wheel unit has a momentary normal force between the tire and road surface, i.e., the wheel load which is influenced in the direction of its greatest possible value. For that purpose, the progression of the wheel load, specifically the dynamic share, is determined from the sensed movements between the wheel units and the vehicle body and/or from the sensed movements of the wheel units. Results of a frequency analysis of the wheel loads and the time progression, specifically the time derivation of the wheel load, are utilized for adjustment of the suspension systems in the sense described above. The suspension systems between the vehicle body and wheels are during braking and/or acceleration maneuvers actuated whereby the mean spacing between the vehicle body and the wheels units is time-progressively reduced during the braking and/or acceleration maneuvers.

14 Claims, 5 Drawing Sheets

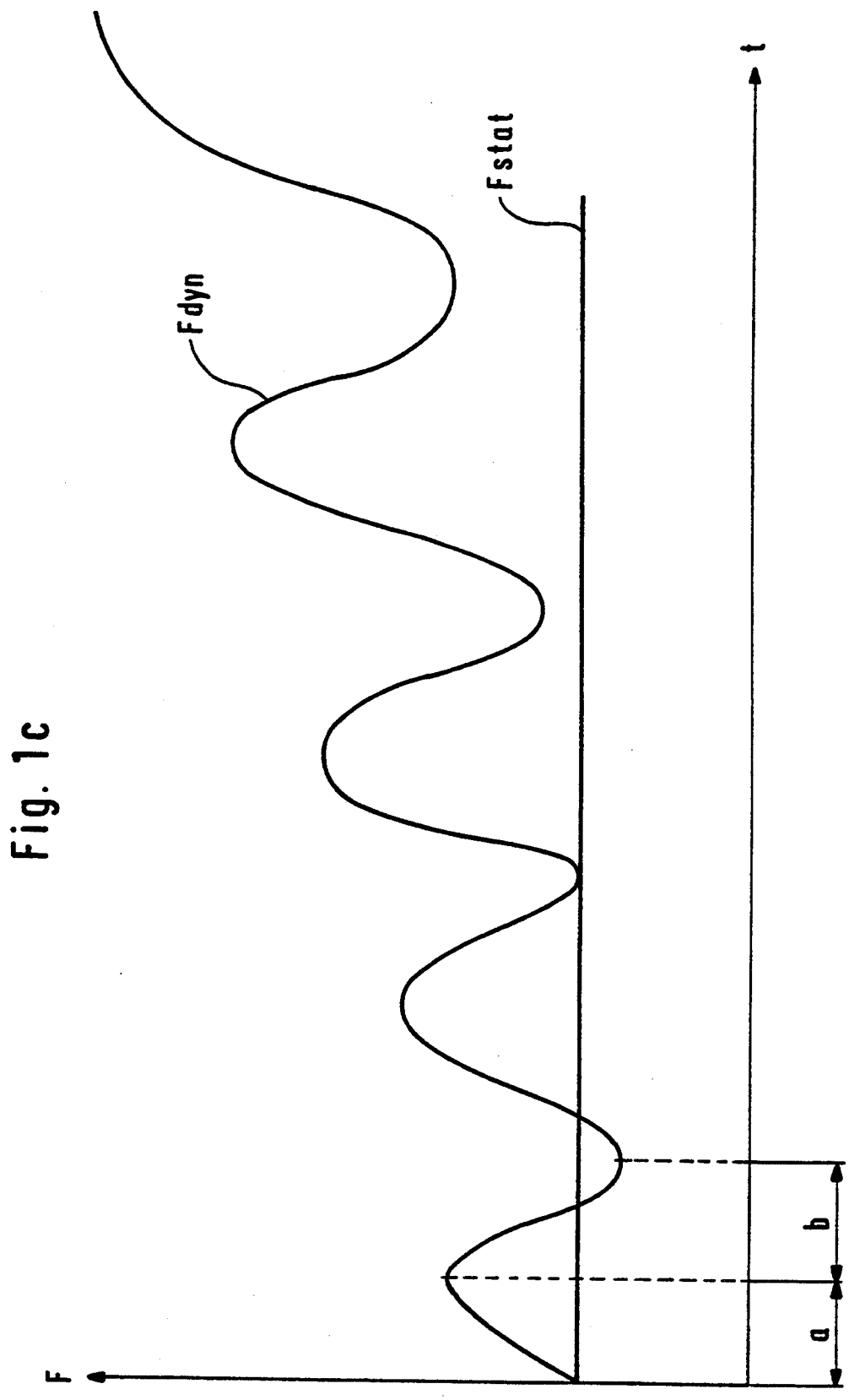

PROCESS AND DEVICE FOR CHASSIS CONTROL

BACKGROUND OF THE INVENTION

The invention concerns a process and device for chassis control of suspension systems.

Known from the prior art are automotive systems which control or regulate the braking or acceleration processes of a vehicle in a fashion such that an optimum retardation, or braking, is assured while at the same time providing sufficient road stability.

The suspension systems between vehicle body and the wheels, as for the most still customary today, may be designed passive, that is with fixed damping and/or spring characteristic, or active, that is with variable damping or spring characteristic. While with the passive suspension systems it is necessary to accept compromises regarding the travel comfort and road safety, the active systems can be extensively adapted to the respective travel situations of the vehicle, so that in situations noncritical in terms of road safety a high travel comfort and in situations critical to road safety a high road safety is achieved.

In the articles "PKW-ABV-Bremssysteme mit weiteren integrierten Funktionen" [Passenger Car ABV Braking System with Further Integrated Functions] (Automobil-Industrie 5/89, pp. 659 through 673) and "Compound Control of Braking and Suspension Systems" (SAE paper 90 51 44, pp. 199 through 211), reference is made to the interactions between the actuations of the braking or propulsion control systems, for one, and the actuations of the suspension systems, for another. Specifically, these interactions are conditioned by the fact that the brake or propulsion control systems usually evaluate the RPM of the vehicle wheels. Detected by sensors, however, the RPM of the vehicle wheels—especially during a braking operation—are characterized by considerable disturbance modulations. Responsible as essential causes therefor are wheel footprint force fluctuations due to vertical stimulations. Furthermore, the article points out that due to the damping characteristic of the shock absorbers—which is differently designed for the traction and thrust stages—there is on time average a traction force generated which causes the vehicle body and the axles to approximate one another, i.e., causes the vehicle body to lower and thus simulate a greater load.

DE-OS 39 39 292 proposes a composite control system for automobiles which consists of an active or semiactive chassis control and antilock system (ABS) and/or drive slip control (ASR) components which jointly utilize sensors and evaluation and control circuits. Provisions for that purpose are that the evaluation circuits determine a safety level and that the control circuits emit, in contingence on the valuation of this safety level, control signals to the ABS/ASR components and the chassis control. Proposed here, specifically, is to always actuate the damping force adjustments during the ABS/ASR control phases in such a way that minimal wheel load fluctuations will occur.

DE-PS 38 37 863, moreover, describes a suspension system for vehicles where the adjustment of the shock absorbers is such that the difference between the damping coefficient for the traction stroke and the damping coefficient for the thrust stroke is varied. Due to the constant short-stroke vibrations of the wheels, caused by unevennesses of the road surface, the respective damper generates a force which acts upon the body and whose magnitude depends on the difference. With the damping coefficients different in the traction and thrust direction it is possible to generate resultant forces in one direction as the damper alternates in quick succession in the traction and thrust directions.

The problem underlying the present invention is to optimize the braking and/or acceleration processes by actuations of the suspension systems during the braking and/or accelerating maneuvers.

SUMMARY OF THE INVENTION

The inventional process is characterized in that during braking and/or accelerating maneuvers the suspension systems are actuated in such a way that the momentary normal force between tire and road surface, the wheel load, is influenced on each wheel unit in the direction of its greatest possible value.

For that purpose, the wheel load progression, particularly the dynamic share, is determined from the sensed movements between the wheel units and the vehicle body and/or from the sensed movements of the wheel units. The results of a frequency analysis of the wheel loads and the time progression, specifically the time derivation of the wheel load, are utilized for adjusting the suspension system in the sense described above.

With the inventional chassis control system, the suspension systems between vehicle body and wheels are during braking and/or acceleration maneuvers actuated in such a fashion that the mean spacing between the vehicle body and the wheel units is progressively reduced during the braking and/or acceleration maneuver.

Furthermore, the invention concerns a device for the application of the process described above which features suspension systems between the wheel units and the vehicle body which are able to influence the movements between the vehicle body and the wheel units, and which features first means through which the suspensions systems are during braking and/or acceleration maneuvers actuated in such a way that on each wheel unit the momentary normal force between tire and road surface, the wheel load, is influenced in the direction of its greatest possible value.

BRIEF DESCRIPTION OF THE DRAWINGS

The invention will be illustrated hereafter with the aid of the embodiments shown in the drawings.

FIG. 1a, 1b and 1c illustrate signal patterns which represent the wheel load;

DETAILED DESCRIPTION OF THE INVENTION

Applicable for the braking force transmitted in a braking operation, under simplified assumptions, is $$F_{brems} = mue \cdot N,$$

where mue is the coefficient of friction and N the normal force between the retarded tire and the road surface, the wheel load. The wheel load is composed of a static share $F_{stat}$ resulting from the vehicle weight and a dynamic share $F_{dyn}$ resulting from the vehicle vibrations stimulated by road unevennesses and travel maneuvers:

$$N = Fstat + Fdyn.$$

Figure 1A:
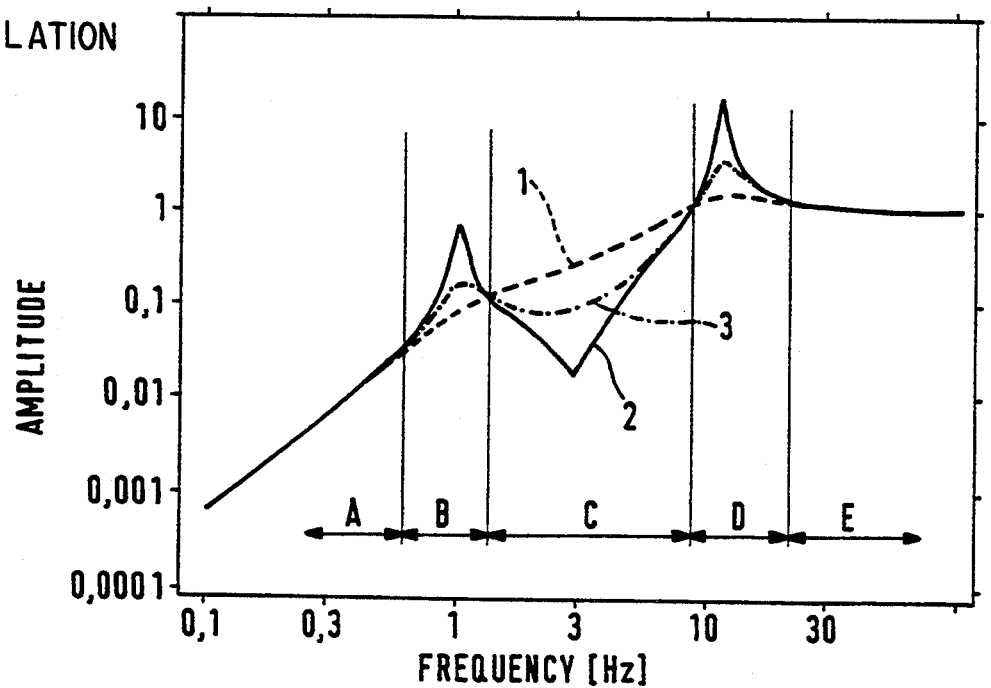

The dynamic wheel load can be influenced across a large frequency range by means of active or partly active or semiactive chassis control. Plotted in FIG. 1a is the quotient of the dynamic wheel load Fdyn and the road stimulation, over the frequency of the road stimulation, for various designs of a chassis. The pattern referenced 2 corresponds approximately to a soft chassis setting, whereas the pattern referenced 1 corresponds to a hard setting of the suspension system. The pattern 3 corresponds for instance to a conventional chassis of passive design. From the amplitude curves in FIG. 1a it is evident that the amplitude can be influenced across large ranges by means of a semiactive damper control. In FIG. 1a, the amplitude response can be subdivided in five characteristic ranges:

Ranges A and E:
  In these ranges, the dynamic wheel load stimulated by the road surface unevennesses cannot be influenced by a semiactive damper control.

Ranges B and D:
  In these ranges, which generally correspond to the resonance frequencies of the vehicle body and the wheels, a conventional "hard" damper tuning results in a reduction of the dynamic wheel load fluctuations (curve 1 in FIG. 1a). A "soft" damper tuning (curve 2 in FIG. 1a) entails in these ranges an increase of the dynamic wheel load fluctuations.

Range C:
  In this range, the inverse performance of the ranges B and D can be observed. Thus, in range C, a "hard" damper tuning leads to an increase of the dynamic wheel load fluctuations (curve 1 in FIG. 1a). A "soft" damper tuning (curve 2 in FIG. 1a), conversely, results here in a reduction of the dynamic wheel load fluctuations.

The amplitude progressions 1 and 2 illustrated in FIG. 1a show that, with today's customary passive chassis control systems, the minimization of the wheel load variations always requires a compromise between hard and soft damper adjustments. Such a progression can be seen for instance in FIG. 1a, marked 3.

Figure 1B:
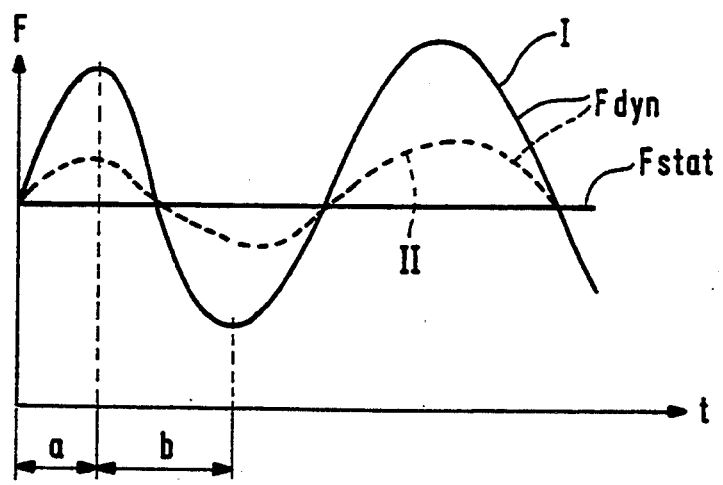

FIG. 1b shows the time progression of the static wheel load Fstat and of the dynamic wheel load Fdyn at a fixed road stimulation frequency. While the static wheel load Fstat depends on the vehicle weight and timewise remains constant, the dynamic share Fdyn, depending on chassis adjustment, has the pattern I or II.

In the ranges B and D, the pattern I would be coordinated with a soft damper tuning and pattern II with a hard damper setting. In the frequency range C, the pattern I corresponds to a hard and the pattern II to a soft damper adjustment.

The prior art, as described in DE-OS 39 39 292, proposes to minimize during braking and/or acceleration maneuvers of the vehicle the wheel load fluctuations illustrated in FIG. 1b. Depending on the frequency of the road stimulation, it is possible to select for instance in the frequency ranges B and D a harder chassis setting and in the frequency range C a softer chassis setting. Obtained in this way, extensively independently from the frequency range, is approximately the signal pattern II shown schematically in FIG. 1b.

As opposed to it, the idea underlying the present invention is that for the shortest possible braking distance at a given state of travel (road unevennesses, travel maneuver) it is necessary to guarantee the greatest possible dynamic wheel load. Upon recognition of a vehicle braking or vehicle acceleration, for instance by evaluation of the differentiated vehicle speed signal, the controller parameters of the chassis control system are by measurement of the dynamic wheel load and/or computation of the dynamic wheel load from suitable measured quantities, such as spring deflection path and/or spring deflection velocity and/or vehicle body acceleration and/or wheel acceleration, so adapted that the normal force will be influenced for the current state of travel in the direction of the greatest possible value. Obtained thereby is the braking distance that is optimal at the respective conditions of travel.

A review of the progression of the dynamic wheel load Fdyn in the time interval a as shown in FIG. 1b evidences that a chassis setting according to pattern I influences the wheel load toward its greatest possible value. In the time interval b, however, the dynamic share of the wheel load decreases, and with it the entire wheel load. This reduction is greater with the chassis setting I than with the setting II. Influencing the wheel load toward its greatest possible value thus means in the time interval b selecting the chassis setting I until the dynamic wheel load increases again. As the dynamic wheel load rises again, the curve I is to be chosen again, since the dynamic wheel load rise is greater here than with curve II. Obtained thereby is the dynamic wheel load pattern shown schematically in FIG. 1c.

Obtained with the above described actuation of the suspension systems during the braking and/or acceleration processes, on time average, is a progressive increase of the entire wheel load. This means that inventionally the suspension systems are during braking and/or acceleration maneuvers actuated in such a way that the mean spacing between vehicle body and wheel units diminishes in a time progression during these maneuvers. With such an activation, the body lowers ever farther toward the wheels, whereby a reduction of the braking distance is obtained.

A detailed embodiment for obtaining the desirable wheel load progression illustrated in FIG. 1c will be described hereafter.

Figure 2:
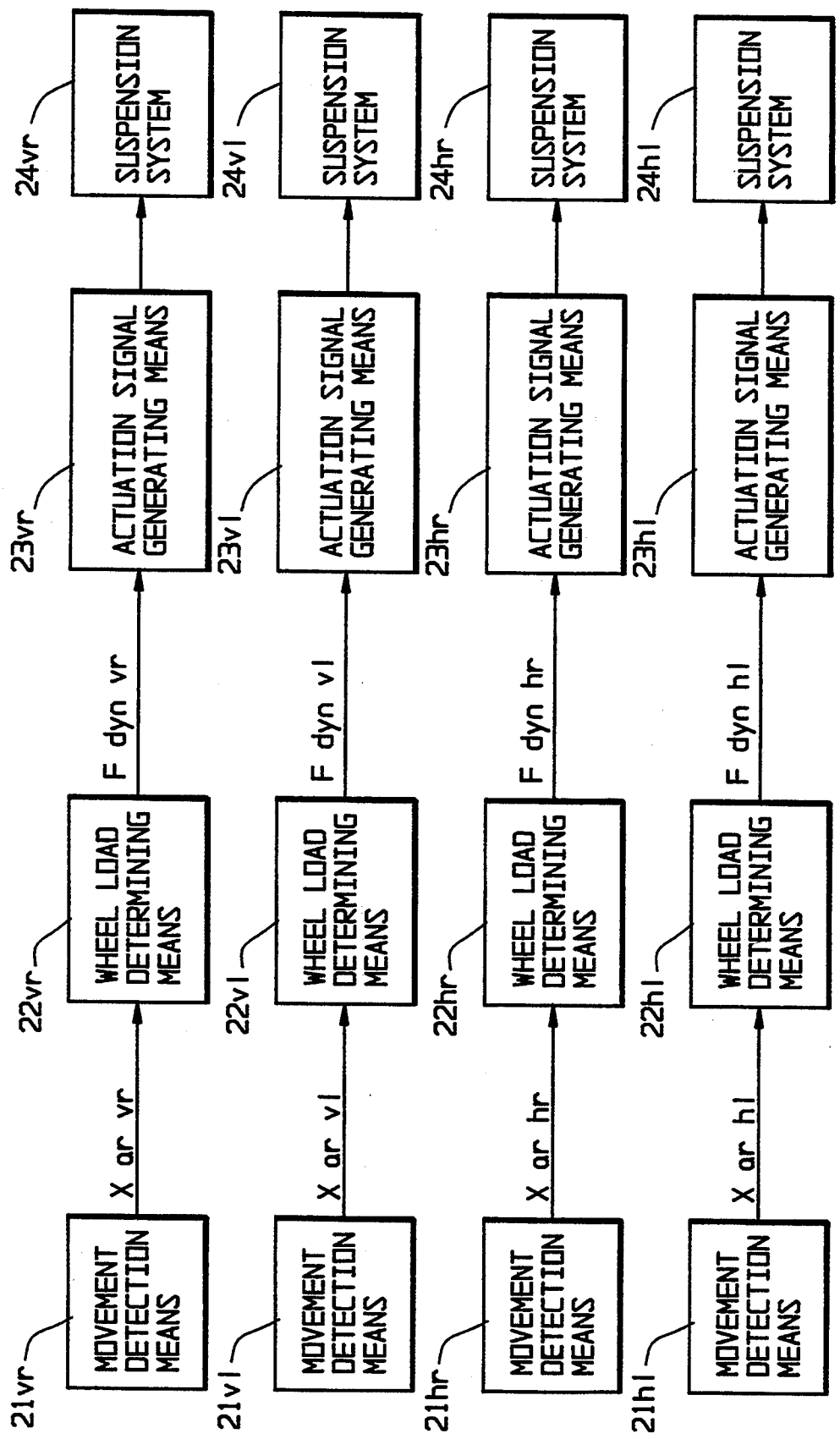
FIG. 2 shows a block diagram of the inventional process.

Referenced 21vr, 21vl, 21hr and 21hl in FIG. 2 are first means for detecting the movements between the wheel units and the vehicle body and/or the movements of the wheel units. Marked 22vr, 22vl, 22hr and 22hl are second means for determining the wheel load. The references 23vr, 23vl, 23hr and 23hl indicate third means by the output signals of which the suspension system 24vr, 24vl, 24hr and 24hl are acted upon.

In the following, the index i passes through the value range v (front) and h (rear), while the index j passes the value range r (right) and l (left). Detected by the first means 21ij are the movements between the wheel units and the vehicle body and/or the movements of the wheel units. This can be accomplished with sensors measuring the spring deflection path and/or the spring deflection velocity and/or the wheel acceleration. Present on the outputs of the first means 21ij are thus second signals Xarij representing the movements between the wheel units and the vehicle body, for instance the spring deflection path and/or spring deflection velocity and/or the movements of the wheel units. These second signals Xarij are passed to the second means 22ij. The second means 22ij have a transfer property such that on the outputs of the second means there are signals Fdynij present which represent the dynamic share of the wheel load.

Figure 4:
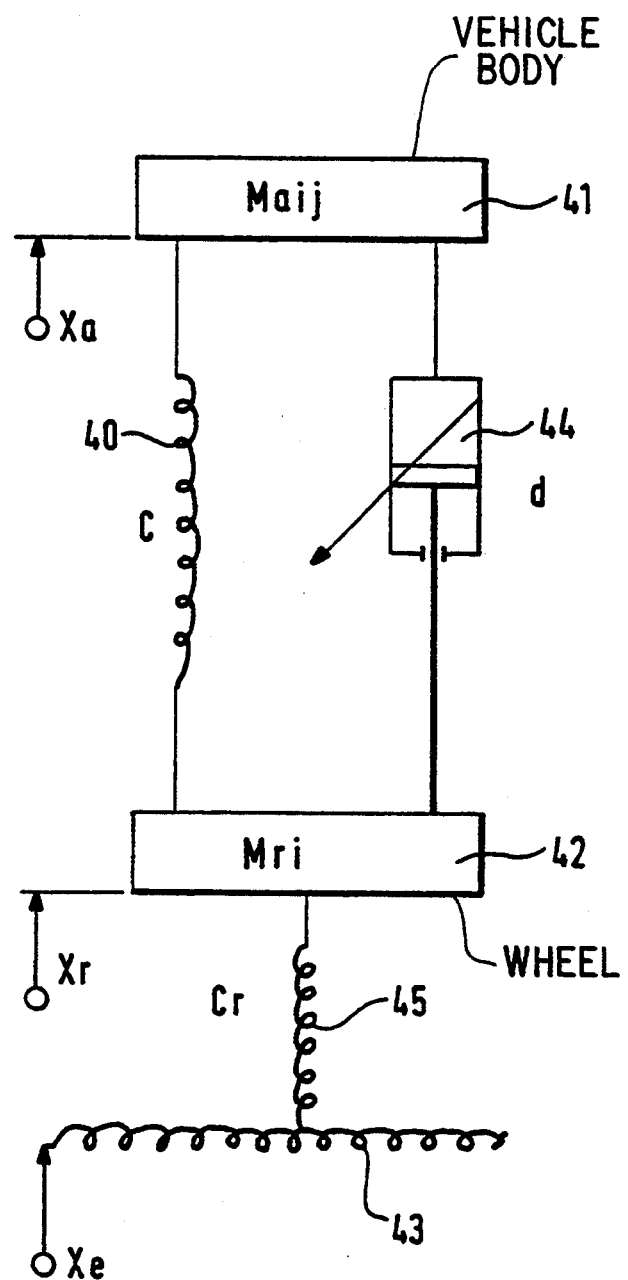
FIG. 4 shows a two-body model.

The transfer property of the second means 22ij can be deduced with the aid of the two-body model of the vehicle body and a wheel unit as shown in FIG. 4.

FIG. 4 shows a suspension system. Marked 41 is the vehicle body with the proportional mass Maij, while 42 marks the wheel with the wheel mass Mri, and 45 indicates a spring with the spring constant Cr. A damper 44 with the damping constant $d$ represents with a spring 40 (spring constant C) of parallel arrangement the suspension system to be controlled/regulated. A damper 44 is configured to be adjustable in its damping characteristic.

The references 40, 41, 42, 43, 44 and 45, in FIG. 4, show a two-body model. The wheel is in contact with the road surface 43. The wheel stiffness, or tire stiffness, is described here in model fashion as a spring 45 with the spring constant Cr. In this embodiment, the damper 44 is assumed to be adjustable, whereas the properties of the spring 40 are described by a constant value C. Additionally, also the spring 40 may be adjustable. The combination of the spring 40 and of the damper 44 adjustable in its damping property thus represents here the suspension system to be controlled/regulated, or Xr, signifies the shift of the vehicle body, or the shift of the wheel, and at that, the shift out of the position of equilibrium with the vehicle at standstill (unloaded state). Marked Xe are the road surface unevennesses.

The correlation between the spring deflection movement Xarij and the dynamic wheel load Fdynij on the ij-th wheel unit derives as $$Fdynij = -[(1+Mr/Ma)*C+(1+Mr/Ma)*d*s+Mr*s^2]*Xarij \quad (1)$$

where s is the Laplace variable and the further variables can be seen from FIG. 4 or from its description. Xarij signifies the so-called "deaveraged" deflection travel which derives from the measured quantity (Xa−Xr)ij, the spring deflection, by subtraction of its current average $$1/Tm * \int_{t-Tm}^{t} [(Xa(r) - Xr(r))ij] dr \quad (2)$$

at $$Xarij(t) = [(Xa(t) - Xr(t))ij] - \left[ 1/Tm * \int_{t-Tm}^{t} [(Xa(r) - Xr(r))ij] dr \right] \quad (3)$$

Here, Tm is a tuning parameter and t the actual point in time. Eliminated by this "deaveraging" of the spring deflection (Xa−Xr)ij are both the influence of a load on the vehicle, that is, a change of the static spring travel, and the influence of asymmetric (with regard to thrust and traction range) spring and/or damper curves (modification of the mean dynamic spring travel) on the calculation of the wheel load fluctuation.

Captured by the first means 21ij in this embodiment, per wheel unit or spring and/or damping system, are the spring deflection movements. This can be accomplished by proper sensors which, e.g., detect the relative spring deflection path and/or the spring deflection velocity and/or variables associated with it, such as the pressure differences in the damping systems. Captured here for each suspension system, by the first means 21ij, are the spring deflection paths (Xa−Xr)ij. Moreover, the first means 21ij determine according to the above equation (3) the "deaveraged" spring deflection paths from the detected spring deflection paths (Xa−Xr)ij. Prevailing on the output of the first means 21ij, the second signals Xarij represent the "deaveraged" spring deflection paths.

A suitable embodiment of the inventional system consists in a supplementary processing of the deflection path signal. Since the transfer function according to equation (1) displays a differentiating behavior between the variables Fdynij and Xarij, it is necessary to ensure that high-frequency disturbances, for instance greater than 20 Hz, will not be amplified in the measured value of the deflection path signal. This can be accomplished, e.g., by using filters of the low-pass filter type or by digital processing in arithmetic units, by an additional algorithm.

The second means 22ij are so configured that, basing on the second signals Xarij present on the input, they form the actual value Fdynij of the wheel load fluctuation according to equation (1). Hence, the third means 22ij are characterized by the transfer property $$-[(1+Mr/Ma)*C+(1+Mr/Ma)*d*s+Mr*s^2].$$

The values of the model parameters (Ma, Mr, C, Cr and d) are either known or can be determined for a specific vehicle whose chassis is to be controlled/regulated, for instance by parameter identification procedures.

Representing the dynamic share of the wheel load, the first signals Fdyn are transmitted to third means 23ij. Present on the output of the third means 23ij are actuation signals for the suspension systems 24ij. The mode of operation of the third means 23ij will be illustrated hereafter with the aid of FIG. 3.

In the third means 23ij, the first signals Fdynij are processed in fourth means 31 with a band-pass type performance. Filtered out by this processing are the shares of the first signal Fdynij which fall in the frequency range C of FIG. 1a. Prevailing on the output of the fourth means 31 is the third signal beta.

The magnitude of the third signal beta depends thus on the frequency of the first signal Fdynij. If the dynamic wheel load has a frequency in the range C of Fig. 1a, the third signal beta is greater than when the dynamic wheel load resides in the frequency range B or D of FIG. 1a. By comparing the third signal beta to the first threshold Ki in the sixth means 33 it is thus possible to decide, depending on the shortfall of, or excess above, the first threshold, whether the dynamic wheel load according to FIG. 1a lies in the frequency range C (comparison result Y1) or in the frequency range B or D (comparison result N1). Obtained in this way are the first comparison results Y1 or N1.

In a further processing branch of the means 23ij, the first signal Fdynij is passed to the fifth means 32, which are characterized by a differentiating transfer property. Prevailing on the output of the means 32 is thus the fourth signal Fdvnij', which represents the time derivation of the dynamic wheel load. This fourth signal Fdynij' is compared in the seventh means 34 to a second threshold Si. The output of the means 34 carries a second comparison signal Y2, if the signal Fdynij' is greater than the threshold Si, whereas as second comparison result the signal N2 prevails if the signal Fdynij' is smaller than the second threshold Si. The first and second comparison results are linked with each other in the unit 35.

Figure 3:
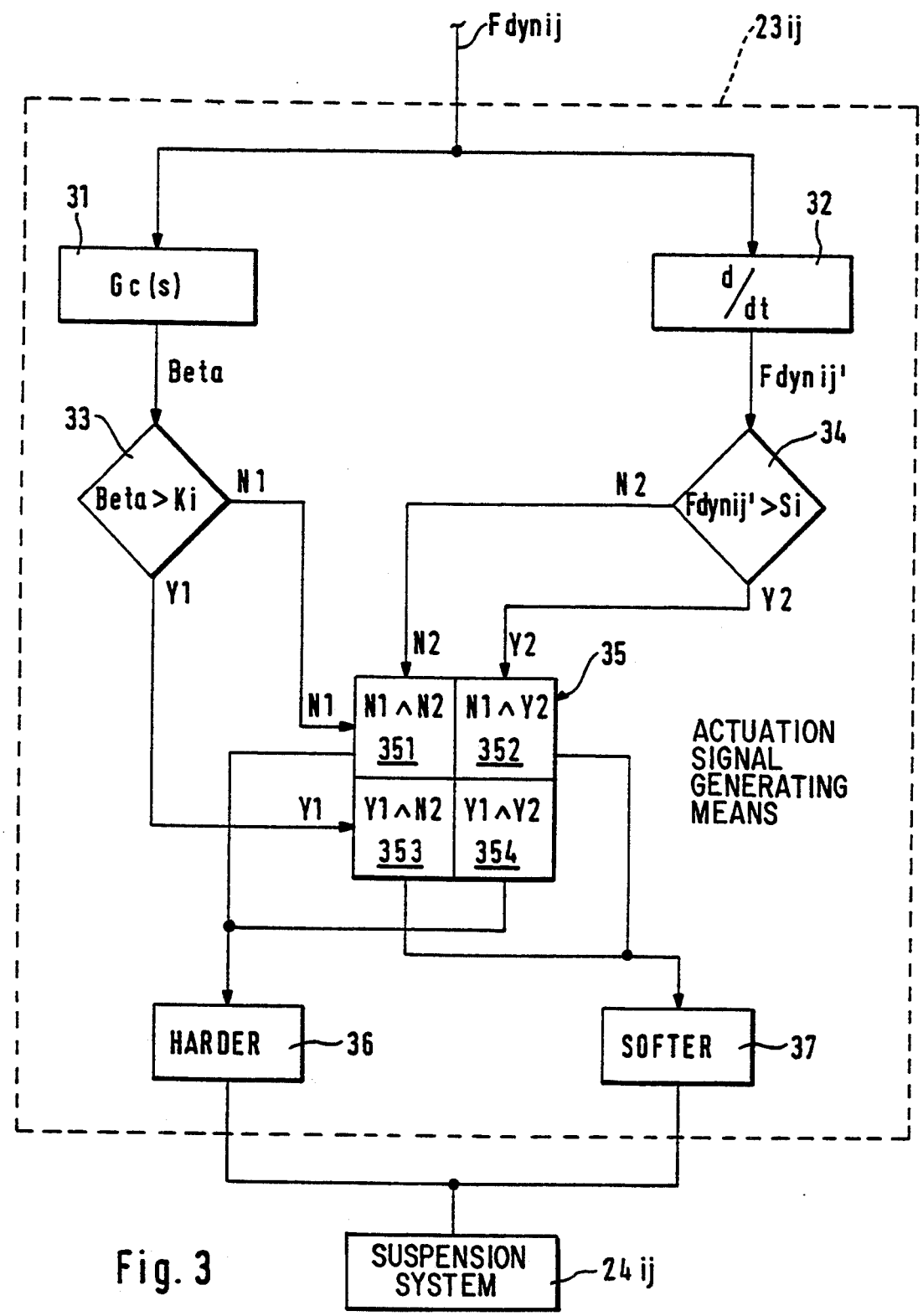
FIG. 3 details the sequence of the inventional process.

If on the output of the means 33 and 34 the signals N1 and N2 are present simultaneously, the suspension systems 24ij are so actuated that they will assume a harder characteristic. This is schematically illustrated in FIG. 3 by the blocks 351 and 36. If on the output of the means 33 the comparison result N1 is present and on the output of the means 34 the signal Y2, the suspension systems 24ij are actuated in such a way that they will assume a softer characteristic. If the linkage results Y1 and N2 are simultaneously present, the suspension system 24ij is adjusted toward soft, while with the linkage results Y1 and Y2 simultaneously present an adjustment is made toward a harder characteristic.

The thresholds KI and SI can be selected either constant or contingent on variables which depend on the state of travel of the vehicle or represent it. Specifically, the threshold SI can be set, e.g., equal to 0.

With the algorithm implemented in the first means 23iJ, the desired wheel load pattern according to FIG. 1c described above is arrived at.

Especially favorable is using the inventional process in vehicles featuring an antilock system (ABS) and/or a drive slip control system (ASR). The inventional actuation of the suspension system takes place here for instance along with the braking and/or acceleration processes, where the antilock system intervenes in a controlling or regulating fashion in the braking process, or the drive slip control system in the acceleration process.

Another provision may be determining by further frequency analyses of the first signals Fdynij whether the frequencies of the momentary wheel load fluctuations lie in the ranges B, D, A or E of FIG. 1a. If it is found that the wheel load fluctuation frequency is in the range A or E, for instance no adjustments of the suspension systems will be made.

What is claimed is:

1. A process for chassis control of a vehicle, the vehicle including a body, a plurality of wheel units and at least one suspension system disposed between the body and a respective one of the wheel units, each said suspension system influencing relative movements between the body and the respective wheel unit, said process comprising the steps of:
   sensing at least one of a relative movement between the body and the respective wheel unit, and an absolute movement of the wheel unit, said sensed movement corresponding to one of a plurality of discrete time segments defining a time period; and
   actuating the suspension system during selected ones of said plurality of discrete time segments in one of a braking and accelerating maneuver of the vehicle, each said actuation influencing a momentary normal force between the respective wheel unit and a road surface toward a maximum value.

2. The process according to claim 1, wherein said actuating step is carried out dependent on a frequency and a time progression of the momentary normal force.

3. The process according to claim 1, further comprising the step of generating a first signal representing at least a dynamic share of the momentary normal force.

4. The process according to claim 3, wherein said generating step comprises generating said first signal dependent on said sensed movement.

5. The process according to claim 3, comprising the further steps of evaluating the first signal frequency-selectively and generating a second signal dependent on said evaluation, and comparing the second signal with a first threshold, said actuating step dependent on said comparison.

6. The process according to claim 3, comprising the further steps of differentiating the first signal and generating a third signal dependent on said differentiation, and comparing the third signal with a second threshold, said actuating step dependent on said comparison.

7. The process according to claim 3, comprising the further steps of evaluating the first signal frequency-selectively and generating a second signal dependent on said evaluation, and performing a first comparison between the second signal and a first threshold, said actuating step dependent on said first comparison; and
   comprising the further steps of differentiating the first signal and generating a third signal dependent on said differentiation, and performing a second comparison between the third signal and a second threshold, said actuating step dependent on said second comparison.

8. The process according to claim 1, wherein said actuating step is carried out during said accelerating maneuver, said accelerating maneuver corresponding to a numeric value of an acceleration of the vehicle which is greater than a selectable threshold level.

9. The process according to claim 1, wherein said process is carried out when at least one of an antilock and drive slip control system present on the vehicle intervenes in one of controlling and regulating the vehicle in the braking and accelerating maneuver.

10. The process according to claim 1, wherein the momentary normal force between the respective wheel unit and the road surface defines a wheel load of the respective wheel unit.

11. A chassis control system for a vehicle, the vehicle including a body, and a plurality of wheel units, said chassis control system comprising:
   means for sensing at least one of a relative movement between the body and the respective wheel unit, and an absolute movement of the wheel unit, said sensed movement corresponding to one of a plurality of discrete time segments defining a time period;
   at least one suspension system disposed between the body and a respective one of the wheel units, each said suspension system influencing relative movements between the body and the respective wheel unit; and
   means for actuating the suspension system during selected ones of said plurality of discrete time segments in one of a braking and accelerating maneuver of the vehicle, each said actuation decreasing an average distance between the vehicle body and the respective wheel unit.

12. The system according to claim 11, further comprising means for generating a first signal representing at least a dynamic share of a momentary normal force between the respective wheel unit and a road surface.

13. The system according to claim 12, further comprising means for frequency analyzing said generating means signal, means for differentiating said generating means signal, and means for threshold value scanning of the frequency analyzed generating means signal and the differentiated generating means signal.

14. The system of claim 12, wherein said dynamic share is dependent on said sensed movement.

* * * * *